May 30, 1967  P. THEVIS  3,322,341
APPARATUS FOR STORING THE QUOTIENT OF A DIVISION
Filed Sept. 27, 1965  3 Sheets-Sheet 2

INVENTOR
Paul Thevis
BY
ATTORNEY

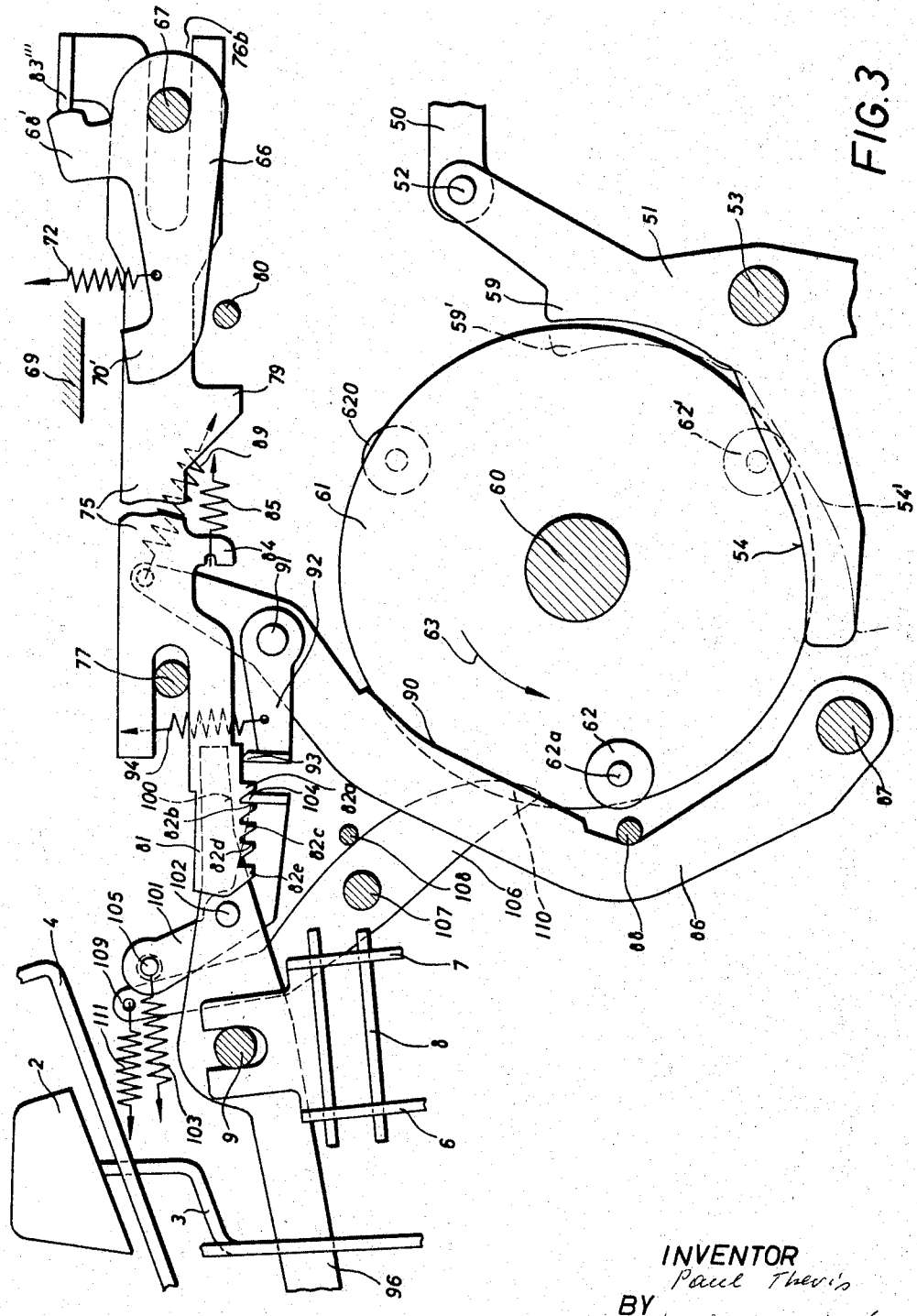

United States Patent Office
3,322,341
Patented May 30, 1967

3,322,341
APPARATUS FOR STORING THE QUOTIENT OF A DIVISION
Paul Thevis, Oberndorf (Neckar), Germany, assignor to Olympia Werke AG, Wilhelmshaven, Germany
Filed Sept. 27, 1965, Ser. No. 490,233
Claims priority, application Germany, Mar. 16, 1965, O 10,713
13 Claims. (Cl. 235—63)

The present invention relates to apparatus for storing the quotient of a division in a register of a calculator, and more particularly in the register of a calculator of the ten key type which is provided with a pin carriage and a multiplication carriage which can be coupled with the pin carriage for step-wise moving with the same during the operations required for carrying out a division.

In calculators of the type with which the present invention is concerned, a dividend is first entered into the pin carriage, and then transferred into a counter, or may be stored in the counter as the result of a preceding calculation, such as an addition, subtraction or multiplication. The divisor is stored in the pin carriage by operation of the keyboard, and is then order by order subtracted from the dividend starting with the highest order until the counter wheels are turned beyond the zero position whereupon an impulse is produced controlling the pin carriage to move to the order below the highest order whereupon subtractions are again repeated. These operations are continued until a quotient having the desired number of orders is formed.

In a calculator of the type with which the present invention is concerned, the counter is controlled to perform an additive operation before the pin carriage is moved to the respective higher order to start a series of subtractive operations, so that the counter has again a positive position, representing a number higher than zero, when the repeated subtractions start.

The number of repeated subtractions required for each order of the dividend is counted and constitutes the quotient of the division. Since the counter always performs for each order of the quotient, a step to a negative position below zero, and then an additive step back to the last positive position, it is necessary to deduct two steps from the number of counter steps in each order to obtain the correct digit in the respective order of the quotient register.

The devices of the prior art serving this purpose are complicated, and require very precise machining of the parts.

It is the object of the invention to improve apparatus for storing the quotient of a division in a register of a calculator, and to provide an apparatus serving this purpose which is of very simple construction, and operates reliably.

Apparatus is known in which a special counter, which is shiftable, rotatable, or mounted for movement along a curved path, is used during the storing of the quotient of a division for counting the subtractive operations.

It is another object of the invention to provide a simple apparatus for forming and storing the quotient of a division without a movable counter.

With these objects in view, one embodiment of the invention comprises a quotient register having a series of ordinal register elements; control means, preferably including a series of ordinal control elements, and being operated by cyclically operating drive means to move between an inoperative position and a control position in which the ordinal control elements respectively cooperate with the register elements of the register; and order selector means for successively connecting the control elements with corresponding register elements while the control means is in the control position.

The control means in the control position are operable by the drive means to move to an actuating position so that the control element which is connected with the respective ordinal register element, shifts the same to the next following digital position when the control means is moved to the actuating position.

In the preferred embodiment of the invention, the register elements are wheels movable in the same direction in which the control elements move to the actuating position. The control means move in a direction transverse to this direction between the inoperative and the control position. The order selector means move along the series of register elements and control elements in a third direction transverse to both previously mentioned directions.

As explained above, two additional operational steps are required for one subtraction beyond zero, and for one addition to again establish the correct number of subtractions for a particular order of the quotient. In order to compensate these two additional operations, the control means of a preferred embodiment of the invention include, in addition to the series of ordinal control elements, also timing means which are operated by the drive means and connected with the series of control elements for moving the same to said control positon only after the drive means have performed a predetermined number of cyclical operations, and more particularly two revolutions before moving the control elements to the actuating position so that time is afforded for the necessary additional steps.

A multiplication carriage is preferably used as order selector means. In the calculator with which the present invention is concerned, the multiplication carriage can be coupled with the pin carriage for step-wise movement with the same during the dividing operation. In the preferred embodiment of the invention, the ordinal control elements are double-armed levers, only one of which is pivoted to engage the corresponding register element by engaging a projection of the multiplication carriage while all control elements are moved to the control position.

By using the multiplication carriage for connecting control elements with corresponding register elements, the provision of a counter required by prior art constructions for counting the subtraction operations, becomes unnecessary. Such counters frequently operate inaccurately due to inertia caused movements beyond the correct position. It is very difficult to drive the quotient counter of the prior art to count in a great number of orders, for example eleven orders. It is a particular advantage of the invention that the existent multiplication carriage can be used with a minor structural change, for carrying out all functions for which a complex counter is required in the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a fragmentary side view of the embodiment of FIG. 1 in the operational position of FIG. 2.

Figure 1:
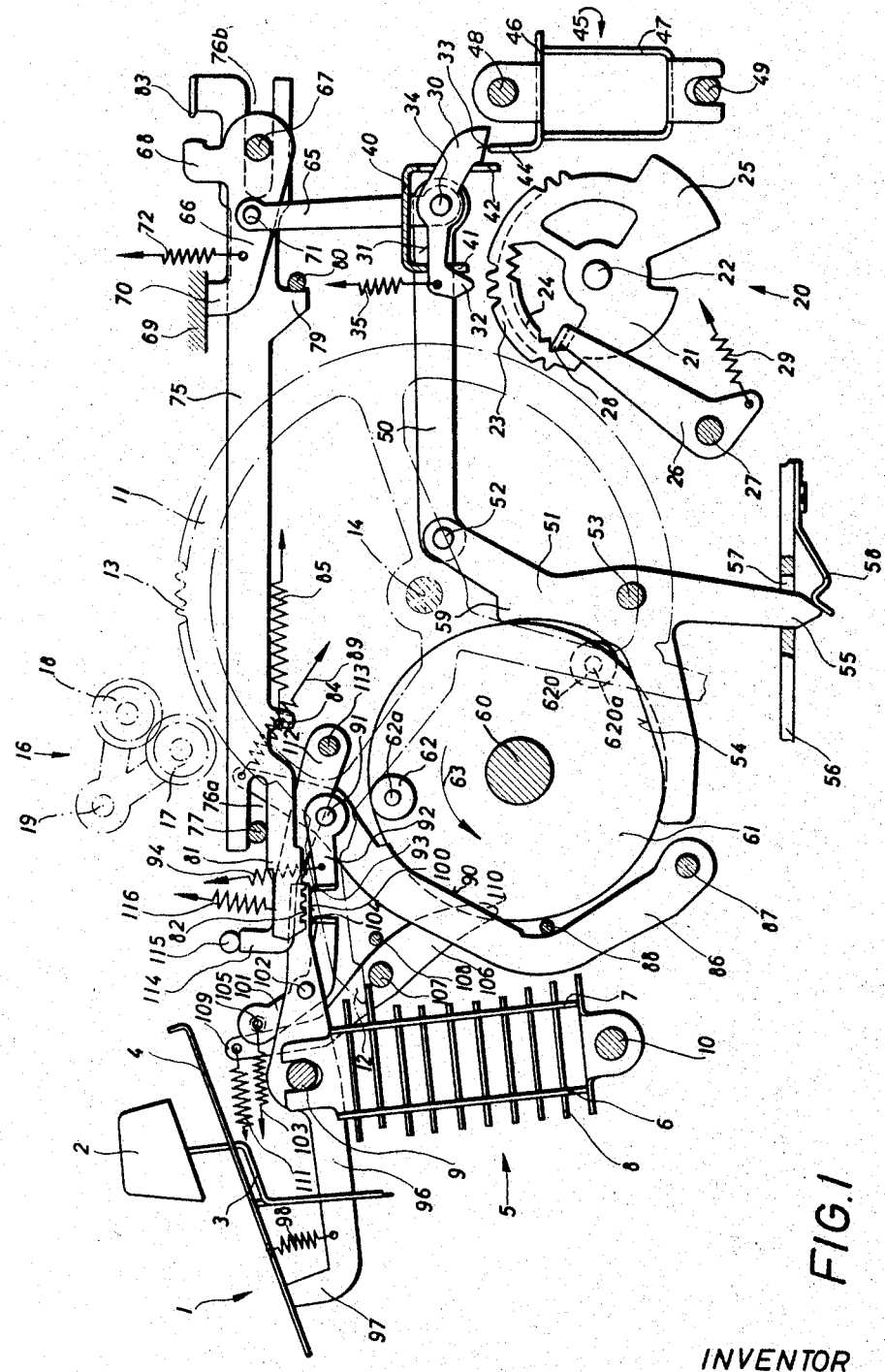
FIG. 1 is a fragmentary side view, partly in section, illustrating an embodiment of the invention in a position of rest.

Referring now to the drawings, and more particularly to FIG. 1, a division key 2 has a stem 3 passing through a corresponding opening in a cover plate 4. Ten digit keys are provided in a standard keyboard, not shown, in the region 1. A pin carriage 5, or other input storage means, is mounted below cover plate 4 for movement along a pair of guide rails in the form of shafts 9 and 10. Pin carriage 5 has a pair of parallel walls 6 and 7 in which an ordinal series of rows of pins 8 is mounted for shifting movement between normal positions and displaced positions indicating the storing of a number in the respective order. Pin carriage 5 is biassed by a spring, not shown, to move along rails 9 and 10 step by step, or in a tabulating motion to a higher order.

When a pin 8 is set by operation of a digit key in the respective ordinal position of pin carriage 5, it projects farther from wall 7, and can be sensed in the usual manner by the sensing fingers of the conventional series of ordinal transfer elements 11 which are respectively provided with teeth 13 cooperating with corresponding ordinal gears 17 or 18 of a counter 16 which is turnable about a shaft 19 between an additive position in which gears 17 and a subtractive position in which gears 18 are driven by teeth 13 of transfer members 11, respectively.

In order to carry out a division, the dividend is entered in counter 16 by the transfer members 11, whereupon the divisor is stored in the pin carriage 5.

A register means 20 has a series of ordinal register elements, shown to be gear wheels 21 rotatable on a shaft 22. Each register wheel 22 has outer teeth 23 having the same pitch as teeth 13 of transfer members 11, and inner teeth 24 cooperating with a corresponding series of arresting levers 26 which are mounted on a shaft 27 and are urged by springs 29 to move to an arresting position in which a catch portion 28 engages the inner teeth 24 of the respective register element 23 to arrest the same. Shaft 22 is movable relative to transfer members 11 so that a meshing engagement between teeth 23 and 13 can be obtained.

Each register gear 23 has a projecting portion 25 for cooperation with pawls, not shown, mounted on a multiplication carriage 45 which is movable along a pair of guide rails 48, 49 parallel to the axis of rotation of register gears 23. The arrangement is described in my copending application Ser. No. 452,026, and does not form part of the present invention which is concerned with division. As described in my copending application Ser. No. 452,027, the multiplication carriage 45 can be coupled by operation of a function key to pin carriage 5 so that the coupled carriages are tabulated together to the highest order of the dividend, and then move stepwise order by order toward the lower order. At the beginning of the division, register 20 is cleared.

Figure 2:
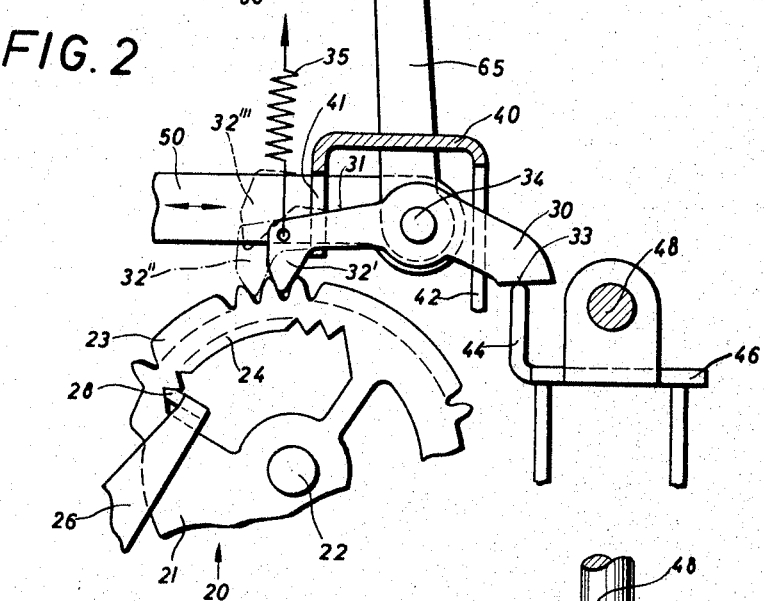
FIG. 2 is a fragmentary side view illustrating a detail of FIG. 1 on a larger scale in another operational position.
Figure 4:
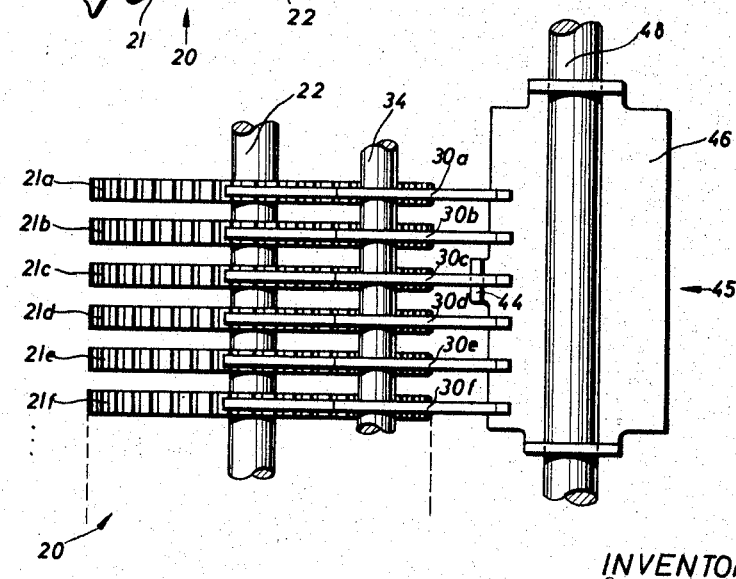
FIG. 4 is a fragmentary plan view illustrating a detail of FIG. 2.

As shown in FIGS. 1, 2 and 4, control elements 30 shown to be double-armed pawls, are mounted on a shaft 34 which is supported by links 65 on an operating member 66. Each control element 30, for example control elements 30a to 30f, as shown in FIG. 4, is located above, and cooperate with a register element 21a to 21f. A spring 72 holds operating member 66 in the position illustrated in FIG. 1 in which portions 32 of control elements 30 are located spaced from gear teeth 23 of the respective register wheels 21. A rigid frame 40 has side walls with slots 41 and 42 forming comb-like guides for the two arms of control elements 30. A spring 35 urges each control element 30 to the position illustrated in FIG. 1 abutting with edge 31 the bottom of the corresponding slot 41. When carriage 45 is moved between ordinal positions, a selector projection 44 successively engages the edge 33 of each control element 30 to support the same as best seen in FIGS. 1, 2 and 4.

If operating member 66 is turned about a stationary shaft 67 from the position of FIG. 1 to the control position shown in FIGS. 2 and 3, all control elements 30 are lowered to a control position, and the one control element 30 which abuts selector projection 44 is turned from a position abutting the bottom of slot 41 to the position of FIG. 2 in which coupling portion 32 is in the position 32′ engaging a pair of teeth 23 of register wheel 21 of the same selected order. As shown in FIG. 4, control element 30c is engaged by selector projection 44 and consequently coupled with register wheel 21c in the lower control position of operating member 66, links 65 and shaft 34 with control elements 30.

Selector projection 44 moves with carriage 45 from the highest order of register 20 to the lowest order while being coupled with pin carriage 5. While a quotient digit is formed in an order by repeated subtraction of the divisor from the dividend stored in counter 17, carriage 45 remains in the same ordinal position, and is then shifted to the next lower ordinal position whereby selector projection 44 supports control element 30 of the next lower order. Consequently, register element 21 of such next lower order is repeatedly moved step by stey by the respective control element 30 in the coupled position shown in FIG. 2 when shaft 34 with all control elements is shifted by a link 50 toward the left as viewed in FIG. 2 to an actuating position in which coupling portion 32 has moved to the position 32″. Carriage 45 has a top wall 46 formed with selector projection 44 and resting on walls 47 in which pawls, not shown, are mounted which perform a function during multiplications.

Cyclically operating drive means are provided for moving link 50 with shaft 34 and all control elements 30 in the lower control position to and from the actuating position. A rotary drive member 61 is driven by a main drive shaft 60 and carries on one side a roller 62 on a pivot 62a, and on the other side a roller 620 carried by a pivot 620a. A first drive lever 51 is rockably mounted on a shaft 53 and has an engaging portion 54 and a restoring portion 59 cooperating with roller 62. A pivot 52 connects drive lever 51 with link 50. Drive lever 51 has an arresting portion 55 cooperating with an arresting spring 58 on a stationary support 56 which has an opening 57 through which an arm of drive lever 51 passes.

When drive member 61 is rotated in the direction of the arrow 63, roller 62 first abuts engaging portion 54 and turns drive lever 51 to the position indicated in chain lines in FIG. 3 which shows roller 62 in the position 62′ and engaging portion 54 in the displaced position 54′. At the same time, arresting portion 55 is shifted to resiliently displace arresting spring 58 whereupon the same arrests drive lever 51 in the displaced position until roller 62 engages restoring portion 59 in the displaced position 59′ and turns drive lever 51 in clockwise direction as viewed in FIGS. 1 and 3 to the initial position shown in solid lines. During the passage of roller 62 over portions 54 and 59, drive lever 51 performs a stroke to the left and a return stroke to the right, displacing all control elements first to the left and then back to the right so that a selected control element 30 which is coupled by selector portion 44 with the corresponding register wheel 21, is shifted to an actuating position for displacing the register wheel one digital step, provided that operating means 66, 65, 34, 32 are in the lower control position shown in FIG. 2. If the operating means are in the higher inoperative position shown in FIG. 1, the displacement of the control lever will have no effect on register 20. Since spring 72 pulls the operating means to the higher inoperative position in which end portion 70 abuts a fixed frame portion 69, it is necessary to turn control member 66 in counterclockwise direction to the position of FIG. 2 before a control element 30 cooperates with a register element 21.

The turning movement of operating member 66, and the corresponding lowering of control elements 30, is obtained by shifting an actuating member 75 from the position shown in FIG. 1 to the position shown in FIGS. 2 and 3 in solid lines. Actuating member 75 has slots 76a and 76b in which a guide pin 77, and shaft 67 of operating member 66 are respectively located. A spring 85 is secured to a projection 84 and urges actuating member 75 to the normal position shown in FIG. 1 in which a stop portion 79 abuts a stop 80 while an actuating portion 83 of actuating member 75 is spaced from the oppositely located portion 68 of operating member 66.

When actuating member 75 is shifted toward the left as viewed in the drawing, actuating portion 83 moves first to the position 83″ engaging portion 68, as shown in FIG. 2, and then to the position 83‴ in which portion 68 is turned to position 68′ to displace operating member 66 so that its portion 70′ is spaced from the abutment 69.

The shifting of actuating member 75 is carried out under control of drive member 61. A second drive lever 86 is mounted on a pivot 87 for rocking movement, and has a free end connected to a spring 89 which urges drive lever 86 to abut a stop 88. Drive lever 86 carries a shifting pawl 92 on a pivot 91. Pawl 92 has a nose 93, best seen in FIG. 3, which is urged by spring 94 acting on pawl 92 into engagement with a rack portion 81 of actuating member 75 which includes a plurality of teeth 82a to 82e.

Drive lever 86 has an engaging portion 90 which is engaged by roller 62 during rotation of drive member 61 so that drive lever 86 is angularly displaced in counterclockwise direction together with shifting pawl 92. If shifting pawl 92 is located in the recess between two adjacent teeth of rack portion 81, actuating member 75 is shifted a step corresponding to the spacing of two rack teeth to the left whereby actuating portion 83 which approaches portion 68 of operating member 66.

Rack teeth 82a to 82e also cooperate with the nose 104 of a holding pawl 101 which is mounted on a pivot 102 carried by a start lever 96 turnable about guide shaft 9 of pin carriage 5 and cooperating with the stem 3 of the division key 2. A spring 103 acts on a pin 105 of holding pawl 101 to turn the same in counterclockwise direction to a position in which nose 104 is located in a recess of rack portion 81, but a spring 98, see FIG. 1, urges start lever 97 to turn in clockwise direction to the normal position shown in FIG. 1 in which edge 100 of start lever 96 engages noses 104 and 93 of pawls 101 and 92 to hold the same spaced from the teeth of the rack portion 81 of actuating member 75.

Holding pawl 101 can also be operated by a releasing lever 106 which is mounted on a pivot 107 and urged by a spring 111 connected to a hole 109 to turn in counterclockwise direction into abutment with a fixed stop 108. The end portion 110 of releasing lever 106 is located on the side of drive member 61 remote from the side on which drive levers 86 and 51 are located, and cooperates with the roller 62a on drive member 61. When roller 62a engages portion 110, releasing lever 106 is angularly displaced in clockwise direction and engages pin 105 of holding pawl 101 to turn the same in clockwise direction to a position in which nose 104 releases rack portion 81.

The clearing lever 112 is mounted on the stationary pivot 113 and has an end portion 114 abutting a movable stop 115 under the action of a spring 116 which is secured to clearing lever 112. Every time when the repeated subtractions have been completed in one order, and pin carriage 5 is moved one step to the right to the next lower ordinal position, stop 115 is operated to turn clearing lever 112 in counterclockwise direction so that the same engages pawls 101 and 92 and moves the same to a position releasing rack portion 81 so that actuating member 75 is pulled by spring 85 to the right as viewed in the drawing to the normal position of rest shown in FIG. 1. At the same time, carriage 45 with selector projection 44 is shifted to the next lower order since it is coupled with pin carriage 5.

*Operation*

At the beginning of a division, the dividend is stored in counter 16 either as the result of an addition, subtraction or multiplication, or transferred by transfer members 11 from pin carriage 5 into which the respective number was entered by operation of the ten digit keys, not shown, of the calculator.

The divisor is entered in the same manner into pin carriage 5 and repeatedly subtracted from the dividend, starting with the highest order until the capacity of counter 16 is exceeded and the same assumes a position representing a negative number. When counter 16 moves below the zero position, an additive operation adding the divisor once is automatically carried out, and at the same time, an impulse for shifting pin carriage 5 is given which effects the carrying out of repeated subtractions of the divisor from the second lowest order of the dividend. Calculator apparatus for carrying out a division in this manner is not an object of the present invention.

Drive member 61 performs a revolution during each cycle of the calculator. During the first revolution, roller 62 displaces drive lever 55 by engaging portion 54 and then returns the same to its initial position by engaging restoring portion 59. This reciprocating motion is transmitted by link 50 to shaft 34 so that all control elements 30 are displaced however, since in the inoperative position of operating means 66, 65, 34, 30, control elements 30 are located spaced from register 20, the movement is without effect.

Division key 2 has been operated and causes coupling of pin carriage 5 with carriage 45 so that the same can move stepwise together in the direction of lower ordinal positions after having been tabulated to the left to the highest ordinal position.

The coupling of pin carriage 5 with carriage 45, which normally serves as multiplication carriage, is disclosed in detail in my copending application Ser. No. 452,027. As described in this application, the coupling is effected by operation of a multiplication key, and the division key 2 of the present application is positioned in relation to the structure disclosed in my copending application to have the same effect as the multiplication key.

Stem 3 of division key 2 also displaces start lever 96 so that its abutment portion 97 moves away from cover plate 4, while edge 100 releases the pawls 92 and 101 so that the same are turned by springs 103 and 81 to operative positions in which shifting nose 93 and holding nose 104 are located in recesses between the teeth of rack portion 81 and actuating member 75.

During the following rotation of drive member 61, roller 62 engages portion 90 of the second drive lever 86 so that shifting pawl 92 is shifted one step to the left as viewed in the drawing and shifts actuating member 75 one step so that actuating portion 83 approaches portion 68 of operating member 66. Nose 104 of holding pawl 101 passes over tooth 82d and snaps into the next following notch of rack portion 81.

When roller 62 moves beyond portion 90, drive lever 86 is moved by spring 89 to its normal position, and shifting pawl 92 makes one step to the right into the next following notch of rack portion 81. When roller 62a then engages portion 110 of releasing lever 106, holding pawl 101 releases the rack portion, but shifting pawl 92 holds actuating member 75 in the same position. At this moment, roller 62 is substantially in the position 62′ of FIG. 3, and portion 54 is in the displaced position 54′.

During the second cycle and revolution of drive member 61, the operations are repeated and actuating member 75 is shifted a second step toward portion 68 of operating member 66, and then held by holding pawl 101. Upon return of the second drive lever 86 to its position of rest, nose 93 of shifting pawl 92 engages the next following notch of rack portion 81 following tooth 82b and holds actuating member 75 when holding pawl 101 shortly releases the rack portion while releasing lever 106 is operated by roller 62a.

After the second revolution, actuating portion 83 is in the position 83″ shown in FIG. 2 and abuts portion 68. Consequently, actuating member 75 has performed two steps without any action on operating member 66, 68 while two machine cycles take place. The two cycles are required in order to prevent operation of register 20 for the two cycles required for the last subtraction by which the zero position of counter 16 was exceeded, and for turning back the counter to a positive position, before the next series of subtractions is started one order lower. It will be seen that members 93, 102, 81, 75, 83 and the related elements, constitute last-motion timing means which are operated by the drive means 62, 86 and connected with operating means 66, 68, 65, 34, 30 for moving the latter after a predetermined number of cycles of the drive means 62, 86, 51 to the control position shown in FIG. 2.

The shifting of the operating means, and more particularly of control elements 30 to the control position cooperating with register 20 as shown in FIG. 2, is obtained during the following third cycle of the machine when drive member 82 performs its third revolution during which roller 62 engages portion 90 and shifts drive lever 86 so that shifting pawl 92 shifts actuating member 75 a third step to the left. Nose 93 now engages the right hand edge of tooth 82a, as shown in FIG. 3, and that no further tooth is provided on the rack portion 81. Nose 104 of holding pawl 101 engages the notch between teeth 82a and 82b. When roller 62 passes beyond portion 90 of drive lever 86, the position of FIG. 3 is obtained. Drive lever 86 has returned to its normal position abutting stop 88, nose 93 of shifting pawl 92 has been moved away from the edge of tooth 82a and is located one step to the right spaced from tooth 82a. Nose 104 engages the notch on the left of tooth 82a so that rack portion 81 with actuating member 75 is held in the position of FIG. 3 in which actuating portion 83 has moved to position 83''' pushing the portion 68 to position 68' and turning operating member 66 in counterclockwise direction to the position shown in FIG. 2 in which the operating means 66, 65, 34, 30, are lowered to a control position.

Due to the action of springs 35, all control elements 30 tend to remain in the position in which edge 31 abuts the bottoms of slots 41 as shown in FIG. 1. However, one control element 30 engages with its edge 33 the selector projection 44 of carriage 45, and this control element, shown to be control element 30c in FIG. 4, is turned to the coupling position illustrated in solid lines in FIG. 2 in which its coupling portion 32 in the position 32' engages a recess between teeth 23 of the corresponding register wheel 21c.

Drive member 61 continuing its third revolution in the direction of the arrow 63 arrives in a position in which roller 62 engages portion 54 of drive lever 51 and turns the same to the position 54' indicated in chain lines in which drive lever 51 is arrested by arresting spring 58. The movement is transferred to link 50 which moves to the left and shifts the control element 30c, together with all other control elements 30, to the actuating position 32'' so that the respective register wheel 21c is turned one step to the next digital position in which it is locked by arresting lever 26, 28.

Roller 62a now engages portion 110 of releasing lever 106 which turns in clockwise direction about shaft 107 and engages with its portion 109 pin 105 of holding pawl 101 so that nose 104 releases the rack portion 81 momentarily. Actuating member 75 is pulled by spring 85 to the right one step until the right hand edge of tooth 82a is stopped by nose 93 of shifting pawl 92.

Since actuating member 75 performs one step to the right, actuating portion 83 moves from the position 83''' to the position 83'' permitting spring 72 to return operating member 66 to its normal inoperative position in which portion 70 abuts the stationary abutment 69. The other elements of the operating means move to the inoperative position so that control levers 30, including the actuated control lever 30c, are located in a higher position in which selector projection 44 permits spring 35 to pull the respective control element 30c to the normal position in which its edge 31 abuts the bottom of the respective slot 41, as indicated in broken lines at 32''.

In the meantime, roller 62 releases portion 54 and engages restoring portion 59 of drive lever 51 so that the same is turned in clockwise direction and pushes through link 50 shaft 34 to its initial position shown in FIG. 1. The return motion of the previously actuated control lever 30c has no influence on register 20, since the coupling portion 32 is now spaced from the teeth 23 of the respective register wheel 21c. In this position, coupling portion 32 is located above the next notch of gear teeth 23 following the previously engaged notch.

The arrangement is such that edge 33 engaging selector portion 44 holds coupling portion 32 in position 32' engaging the gear teeth of the respective register wheel during the entire time control elements 30 are lowered so that the respective register wheel cannot turn by inertia beyond the desired position.

The above described cyclical operations are repeated for each order of the quotient. After exceeding the capacity of counter 16, an additive correcting operation, and the return of the pin carriage are effected. At this time, a complete digit of the quotient is stored in the register wheel 21 which was selected by the position of carriage 45 moving with pin carriage 5 since selector projection 44 was placed in the region of the control element 30 of the respective order.

Pin carriage 5 is returned one step against the action of its spring, not shown, to move carriage 45 coupled therewith to the next following lower order in which selector projection 44 cooperates with control element 30 of the next lower order. During this stepwise movement of pin carriage 5, the movable stop 115, actuated by the pin carriage 5, moves clearing lever 112 against the action of spring 116 in counterclockwise direction so that the shifting pawl 92 and holding pawl 101 release the rack portion 81 so that actuating member 75 is returned by spring 85 to the initial position shown in FIG. 1 in which stop portion 79 abuts stop 80.

With carriage 45 and selector projection 44 located at the next lower order, the above described cyclical operations are repeated, and drive member 61 performs three revolutions. During the first two revolutions, the timing means including actuating member 75 are operated by the drive means, but do not actuate the operating means by turning operating member 66.

During the third revolution, operating member 66 is turned by actuating portion 83, as described above, so that the operating means including control elements 30 are lowered to the control position in which control elements 30 are adapted to cooperate with register 20, only one control element being actually coupled by selector projection 44 with the respective register element 21, and shifting the same to the next following digital position when roller 62 shifts drive lever 51 and link 50 to the left to move the coupled control element 30 to an actuating position.

It will be seen that the timing means 92, 102, 81, 75, 83 and the operating means 68, 65, 30 together constitute control means operable by the drive means 61, 86, to move between the higher inoperative position and the lower control position cooperating with the register 20, and also operable by the drive means, particularly drive lever 51, in the control position to move to an actuating position as described with reference to FIG. 2. Carriage 45 and selector projection 44 constitute order selector means for successively connecting the control means in the control position with the ordinal register elements since carriage 45 travels from order to order in a stepwise movement between ordinal position for connecting the respective control elements 30 of the control means with the corresponding ordinal register element 21.

In the above description of the operation, it was assumed that the dividend is greater than the divisor. If the dividend is small than the divisor, corresponding to the remainder of the dividend in the normal division where the dividend is greater than the divisor, the machine performs only two machine cycles, namely a subtractive cycle in which the capacity of counter 16 is exceeded in a negative sense beyond zero, and an additive correcting operation for again entering the divisor in counter 16 so that a positive remainder remains stored. In this case, no quotient digit is formed and stored in register 20 since during the two inoperative steps of the timing means with actuating member 75, the operating means are not moved to the control position in which control elements 30 cooperate with register 20.

If the dividend, or the remainder of the dividend is equal or greater than the divisor, the machine performs one to nine division cycles, a subtractive operation during which the capacity of the counter 16 is exceeded in the negative sense, and an additive correcting operation during which the divisor is again once added. In the register 20, the correct digit in the respective order is formed and stored, since the control elements 30 are ineffective during the two operations which have to be carried out in addition to the operations required for obtaining the correct digit. Consequently, the correct digits are stored in the orders of register 20, and no corrective operations of register 20 are required.

When all orders of a quotient have been entered into register 20, the quotient is automatically printed in the usual manner.

It will be understood that each of the elements described above, or two or more together, may also find a useful application in other types of calculators differing from the types described above.

While the invention has been illustrated and described as embodied in an apparatus for storing the quotient of a division in a register without corrective register operations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a calculator, in combination, apparatus for storing the quotient of a division, comprising register means including a series of ordinal register elements movable between a plurality of digital positions for storing the quotient of a division; means stepwise movable during the formation of a quotient along said series of register elements to successive ordinal positions registering with successive register elements; control means including an ordinal series of control elements respectively registering with said register elements, and being movable between an inoperative position and a control position, the one control element which registers with said stepwise movable means being coupled by the same in said control position with the respective register element, said control elements being mounted for movement in said control position to and from an actuating position; cyclically operating rotary drive means connected with said control means for moving said series of control elements during each revolution to and from said actuating position; and lost-motion timing means connecting said drive means with said control means for actuating said control means only after two revolutions of said drive means to move from said inoperative position to said control position so that said one coupled control element, when moved to said actuating position, moves said register element coupled therewith to successive digital positions during the third and the following revolutions of said drive means.

2. A calculator according to claim 1 including means supporting said control means for movement in a first direction from said inoperative position to said control position, means supporting said control elements for movement in a second direction transverse to said first direction to and from said actuating position, and means supporting said control elements for turning movement to and from a position coupled with the respective register element.

3. A calculator according to claim 1 wherein said control elements are control levers, wherein said control means include a shaft supporting said control levers for turning movement in said control position to and from a coupled position engaging the respective register element; wherein said stepwise movable means includes a selector portion providing a fulcrum for the respective registering control lever so that the same turns to said coupled position during movement from said inoperative position to said control position; and wherein said drive means moves said shaft with said control levers to said actuating position so that said lever in said coupled position moves the respective register element to the next following digital position.

4. A calculator according to claim 3 including a frame portion having comb-shaped walls formed with slots for guiding said levers for turning movement about said shaft; and a spring for urging each lever into a position in which one end thereof abuts the bottom of the respective slot in said frame, while the respective lever in said coupled position is turned by said selector portion away from said bottom.

5. A calculator according to claim 1 wherein said drive means include a rotary member, a first drive lever reciprocated by said rotary drive member and connected with said control elements for moving the same to and from said actuating position, and a second drive lever reciprocated by said rotary drive member and connected with said lost-motion timing means for actuating the same and thereby said operating means to move to said control position after two revolutions of said rotary drive member.

6. A calculator according to claim 5 wherein said first and second drive levers are mounted for turning movement about parallel axes, wherein each drive lever has an engaging portion, said engaging portions being successively engaged by said rotary drive member, and wherein said first drive lever includes a restoring portion engaged by said drive member to restore said first drive lever to its initial position after displacement of the same by said drive member engaging said engaging portion thereof whereby said control elements are reciprocated to and from said actuating position by said first drive lever.

7. A calculator according to claim 5 wherein said operating means includes a turnable operating member having an inoperative position and a displaced position for placing said control elements in said control position; and wherein said lost-motion timing means include an actuating member, and stepping means for moving said actuating member stepwise toward said operating member and finally to a position in which said operating member is turned by said actuating member from said inoperative position to said displaced position, said stepping means being operated by said second drive lever during each revolution of said drive member.

8. A calculator according to claim 7 including a spring for urging said actuating member to a normal inoperative position spaced from said operating member two steps; a spring urging said operating member to said inoperative position; and a stop limiting movement of said actuating member; wherein said actuating member includes a rack portion having teeth and notches; and wherein said stepping means include a spring biased shifting pawl mounted on said second drive lever and a holding pawl cooperating with said rack portion; and including a releasing member controlled by said drive member for releasing said holding pawl.

9. A calculator according to claim 8 wherein said actuating member has an actuating portion and said operating member has a portion cooperating with said actuating portion and being spaced from the same two steps in said inoperative position of said operating member and in said normal inoperative position of said actuating member.

10. A calculator according to claim 8 and including a division key; a start lever turnably supporting said holding pawl; a spring urging said holding pawl to engage said rack portion; a spring urging said start lever to a position for holding said shifting pawl and said holding pawl in an inoperative position spaced from said rack portion; and wherein said division key is operable to turn said start lever to a position permitting engagement of said rack portion by said holding pawl and shifting pawl.

11. A calculator according to claim 2 wherein said stepwise movable means is a carriage means including a pin carriage.

12. In a calculator, in combination, apparatus for storing the quotient of a division, comprising register means including a series of ordinal register gears turnable between a plurality of digital positions for storing the quotient of a division; carriage means stepwise movable during the formation of a quotient along said series of register gears to successive ordinal positions registering with successive register gears; control means including a control member, a shaft supported on said control member, and an ordinal series of double-armed control levers mounted on said shaft for turning movement and respectively registering with said register elements, said control member and said shaft with said control levers being movable in a first direction between an inoperative position and a control position, the one control lever which registers with said stepwise movable means being engaged by the same during movement from said inoperative position to said control position and turned about said shaft to a coupled position coupled with the corresponding register gear, said shaft and said control levers being movable in a second direction transverse to the first direction in said control position to and from an actuating position so that said coupled control lever turns the respective register gear one step to the next following digital position; cyclically operating drive means including a rotary drive member and first and second drive levers reciprocated by said rotary drive member, said first drive lever being connected with said control shaft for moving said series of control levers during each revolution of said drive member to and from said actuating position; and lost-motion timing means connecting said second drive lever with said operating member for actuating said operating member to move with said shaft and control levers to said control position only after two revolutions of said drive member so that said one coupled control lever, when moved to said actuating position by said first drive lever, turns the respective register gear coupled therewith to successive digital positions during the third and the following revolutions of said drive member.

13. A calculator according to claim 12 wherein said lost-motion timing means include an actuating member having a rack, and stepping means including pawl means mounted on said second drive lever and cooperating with said rack for stepwise moving said actuating member toward said operating member, said actuating member and said operating member having normal positions in which they are spaced from each other a distance corresponding to two steps of said actuating member shifted by said pawl means so that said operating member is engaged by said actuating member and moved to said control position during the third and following revolutions of said drive member.

References Cited
UNITED STATES PATENTS

| | | | |
|---|---|---|---|
| 2,736,494 | 2/1956 | Ellerbeck et al. | 235—63.22 |
| 2,755,997 | 7/1956 | Ellerbeck | 235—63.22 |
| 2,764,347 | 9/1956 | Ellerbeck | 235—63.21 |
| 3,104,812 | 9/1963 | Lagomarsino | 235—63.22 |

RICHARD B. WILKINSON, *Primary Examiner.*

LOUIS J. CAPOZI, *Examiner.*

J. G. MURRAY, STANLEY A. WAL,
*Assistant Examiners.*